No. 12,824. REISSUED JULY 7, 1908.

S. B. KENT.

BRACELET.

APPLICATION FILED NOV. 5, 1907.

WITNESSES

Julius H. Roth

P. V. R. Key

INVENTOR

Stephen B. Kent

BY

Thos H. Dowrisdale

ATTORNEY.

UNITED STATES PATENT OFFICE.

STEPHEN B. KENT, OF EAST ORANGE, NEW JERSEY.

BRACELET.

No. 12,824. Specification of Reissued Letters Patent. Reissued July 7, 1908.

Original No. 804,137, dated November 7, 1905, Serial No. 264,133. Application for reissue filed November 5, 1907. Serial No. 400,894.

*To all whom it may concern:*

Be it known that I, STEPHEN B. KENT, a citizen of the United States, and a resident of East Orange, in the county of Essex and State of New Jersey, have invented certain new and useful Improvements in Bracelets, of which the following is a specification.

This invention relates to articles of personal adornment known as bracelets, an exceedingly popular form of which is the seemingly unbroken band or ring of precious metal. If this band or ring is of suitable size, it is obvious that provision must be made for getting it on and off the arm or wrist of the wearer, with which end in view the ring is usually segmental, the two parts being hinged at one end and provided with a suitable clasp at the other. These rings or bands are generally hollow or tubular, and to prevent loss of the article while being worn through the accidental unclasping of the parts (and for other reasons) it is desirable that a blade or guard be provided, completely incased within the tube when the bracelet is closed and limiting separation of the parts and bridging the gap between them when the bracelet is opened.

This invention has particular reference to improvements in the construction of a bracelet provided with such a blade or guard, among other things having in view the concealment of the clasp or fastening as well as the hinge in order to present, as nearly as possible, when the bracelet is closed, a band or ring having a smooth and unbroken surface.

In addition to the above, I have in view improvements in the manner of securing and adjusting the blade or guard, for the purpose of producing a more finished article of jewelry and augmenting the strength of what must naturally be a comparatively weak construction.

Figure 1:
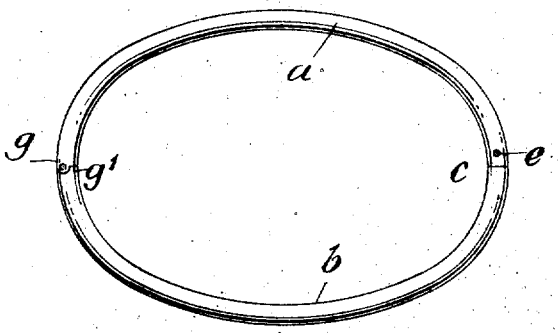
Figure 2:
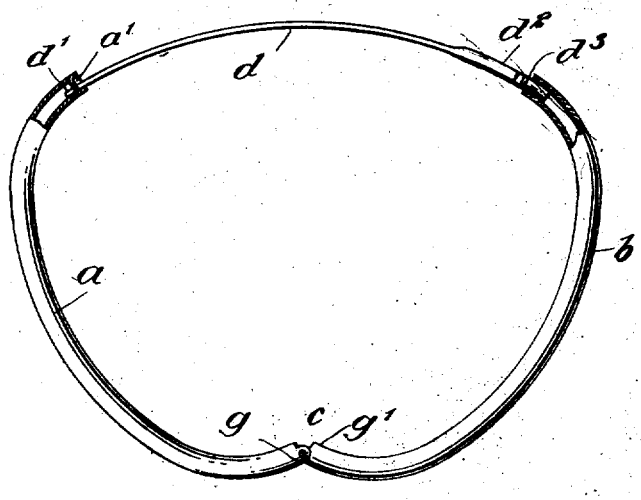
Figure 3:
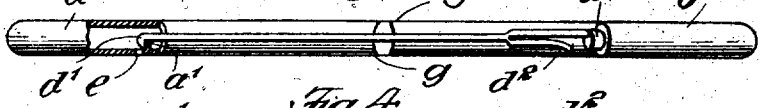
Figure 4:
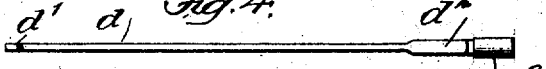
Figure 5:
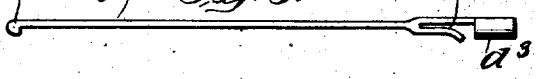
Figure 6:
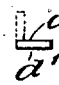
Figure 7:
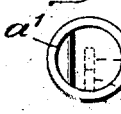

My invention will be more readily understood by reference to the accompanying drawings, forming a part of this specification, in which Figure 1 is an exterior view of the bracelet closed; Fig. 2 is an enlarged and partly sectional view of the bracelet in an open position; Fig. 3 is a plan view of Fig. 2; Figs. 4, 5 and 6 are, respectively, an edge, a plan and an end view of the blade or guard, and Fig. 7 is a view of the mouth of the segment through which the blade or guard passes.

In the drawings, I have shown a bracelet consisting of the two segments *a* and *b* of hollow wires or curved tubes hinged together at *c*. In the mouth of the segment *a* is provided a small catch-piece *a'*, partly closing or obstructing the mouth of the tube. In the mouth of the segment *b* is secured, preferably by solder, the suitably enlarged end of the spring blade or guard *d*, the opposite end of which is inserted in the mouth of the segment *a*. The guard *d* is provided at its free end with a laterally projecting lug *d'*, adapted to engage or impinge against the catch-piece *a'* when the bracelet is opened. This lug *d'* is preferably an extension or projecting continuation of the guard *d*, and the guard *d* may be said to be a reduced continuation of a plug $d^3$ inserted and secured in the mouth of the segment *b* and which is of the same diameter as the internal diameter of the segments.

The guard *d* should naturally be made of spring metal, so as to have both flexibility and elasticity, as its curvature is subject to constant change as the bracelet is opened or closed. I provide this guard *d* with a laterally-projecting spring-tongue $d^2$ near its fastened end, which, when the bracelet is closed, is forced inwardly as it enters the mouth of the segment *a*, past the catch-piece *a'*, with which the free end of the tongue $d^2$ engages, when complete closure is effected, and clasps or locks the two segments together to form a substantially continuous and unbroken ring. To provide for opening, I prefer to provide a pin-hole *e* in the side of the segment *a*, immediately back of the catch piece *a'*, so that by the insertion of the point of a pin, or the like, the spring-tongue $d^2$ can be pressed out of engagement with the catch-piece *a'* and the segments separated at the joint.

In order to properly assemble the parts of which my bracelet is comprised, the guard *d*, which is, of course, a separate and individual member of the bracelet, is first turned at right angles to its normal position (as indicated by the dotted lines in Fig. 7) so that the lug *d'* may clear the catch-piece *a'* at the mouth of the segment *a*, and this end of said guard telescoped into said segment. The enlarged end of said guard is then inserted and secured in the mouth of the segment *b* and the bracelet is complete.

As one of the objects of my invention is to produce a joined bracelet similar to a so-called bangle-bracelet, by so constructing it as to conceal the joints, seams, clasp and hinge parts, I make the ends of the segments *a* and *b* flush and even with the rest of the bracelet and similarly finish the hinge-ends and locate the hinge members *g g'* inside the surface of the sections, so that when the bracelet is closed no seams, joints, hinge or locking parts will be apparent, but the bracelet will present the appearance of a continuous or unbroken ring or bangle. In order to prevent the formation of burs or fins on the ends of the segments, as occurs when the ends are brought into close contact, I shoulder the fastened end of the guard *d*, as shown at $d^3$, so that the shoulder will abut against the catch-piece *a'* and prevent the ends of the segments from coming into forcible contact with each other.

I claim as new and desire to secure by Letters Patent:

1. A bracelet comprising two hollow sections hinged together, a plug secured within and projecting from the free end of one of said sections and providing a seat for the open end of the other section, said plug carrying a guard and a latch, the former entering the opposing section and bridging the space between the ends of said sections when separated, and a stop within said opposing section coöperating with the end of said guard to prevent complete withdrawal thereof and with said latch to lock said section in their closed condition.

2. A bracelet comprising two hollow sections hinged together, one of said sections being provided with an integral member, a portion of which forms a plug adapted to be secured within the free end of said section, another portion of which provides a guard which enters the opposing section and bridges the space between the ends of said sections when separated, and another portion of which provides a latch to lock said sections in their closed condition.

3. A bracelet comprising two hollow sections hinged together, one of said sections being provided with an integral member, a portion of which forms a plug adapted to be secured within the free end of said section, another portion of which provides a guard which enters the opposing section and bridges the space between the ends of said sections when separated, and another portion of which provides a latch to lock said sections in their closed condition, and means for releasing said latch, said integral member being entirely contained within said sections when closed and said sections thus forming a ring of unbroken contour.

4. A bracelet composed of tubular sections hinged together, one of said sections having secured within its free end a plug with a projecting boss having secured thereto a combined guard and latch, said plug being of the same diameter as the internal diameter of the hinged sections, and the opposing section provided with a combined stop and catch piece within its open end, against which said plug abuts when the bracelet is closed, and with which said latch engages, and with a pin-hole in its side back of said stop and catch-piece, through which access may be had to the interlocking latch to disengage the latter from the catch-piece.

5. A bracelet composed of tubular sections hinged together, one of said sections being provided with a combined catch-piece and stop within its open end, and the opposing section provided with a plug inserted in and projecting from its end and of the same diameter as the internal diameter of the sections, and having attached thereto a spring-guard adapted to slide within the first-named section and having a lug at its free end to prevent withdrawal, said guard being formed at its other end with a laterally-projecting spring tongue or catch adapted to engage with the catch-piece.

6. A bracelet composed of two tubular sections hinged together, one of said sections being provided with a combined catch and stop within its free end, and back of its mouth, and the other section provided with a plug secured in and projecting from its free end and of the same diameter as the internal diameter of the hinged sections, and having attached thereto a spring-guard which enters and moves within the first-named section and is provided with means for engaging said stop when the bracelet is opened and closed, the projecting end of said plug being adapted, when the bracelet is closed, to enter the end of the opposite section and to abut against said stop.

In testimony of the foregoing, I have hereunto set my hand in the presence of two witnesses.

STEPHEN B. KENT.

Witnesses:
F. C. TOMLINSON,
H R. BAUER.